(12) United States Patent
Upson et al.

(10) Patent No.: US 6,635,737 B1
(45) Date of Patent: Oct. 21, 2003

(54) POLYMERS DERIVED FROM LOW UNSATURATION POLYAMINES

(75) Inventors: Donald A. Upson, Eugene, OR (US); Omar Tiba, Eugene, OR (US); Robert M. Loomis, Eugene, OR (US)

(73) Assignee: Williamette Valley Company, Eugene, OR (US)

( * ) Notice: Subject to any disclaimer, the term of this patent is extended or adjusted under 35 U.S.C. 154(b) by 0 days.

(21) Appl. No.: 09/865,290

(22) Filed: May 25, 2001

Related U.S. Application Data

(60) Provisional application No. 60/227,552, filed on Aug. 23, 2000, and provisional application No. 60/208,078, filed on May 26, 2000.

(51) Int. Cl.[7] ......................... C08G 69/00; C08G 18/00
(52) U.S. Cl. ......................... 528/310; 528/44; 528/61; 528/64; 528/68; 528/76; 528/78; 528/85; 528/328; 528/407; 521/159; 524/710; 524/840; 525/420; 525/440; 525/459
(58) Field of Search ......................... 528/310, 44, 64, 528/61, 68, 76, 78, 85, 407, 328; 521/159; 524/840, 710; 525/420, 440, 459

(56) References Cited

U.S. PATENT DOCUMENTS

| | | | | |
|---|---|---|---|---|
| 3,654,370 A | | 4/1972 | Yeakey | 260/584 B |
| 4,229,561 A | | 10/1980 | Schmidt et al. | 528/68 |
| 4,260,729 A | | 4/1981 | Schmidt et al. | 528/68 |
| 4,317,894 A | * | 3/1982 | Lewarchik et al. | 525/455 |
| 4,425,468 A | * | 1/1984 | Makhlouf et al. | 524/710 |
| 4,732,919 A | | 3/1988 | Grigsby, Jr. et al. | 521/159 |
| 4,766,245 A | | 8/1988 | Larkin et al. | 564/474 |
| 4,845,133 A | | 7/1989 | Priester, Jr. et al. | 521/167 |
| 4,902,768 A | | 2/1990 | Gerkin et al. | 528/68 |
| 4,902,777 A | | 2/1990 | Gerkin et al. | 528/407 |
| 4,910,279 A | | 3/1990 | Gillis et al. | 528/49 |
| 5,082,917 A | | 1/1992 | Su et al. | 528/68 |
| 5,093,380 A | | 3/1992 | Takeyasu et al. | 521/131 |
| 5,096,993 A | | 3/1992 | Smith et al. | 528/61 |
| 5,100,997 A | | 3/1992 | Reisch et al. | 528/60 |
| 5,104,930 A | | 4/1992 | Rinde et al. | 524/871 |
| 5,104,959 A | | 4/1992 | Hess et al. | 528/79 |
| 5,106,874 A | * | 4/1992 | Porter et al. | 528/64 |
| 5,112,282 A | | 5/1992 | Patterson | 474/260 |
| 5,116,931 A | | 5/1992 | Reisch et al. | 528/59 |
| 5,118,728 A | | 6/1992 | Primeaux | 523/315 |
| 5,124,426 A | | 6/1992 | Primeaux, II et al. | 528/60 |
| 5,128,441 A | * | 7/1992 | Speranza et al. | 528/335 |
| 5,136,010 A | | 8/1992 | Reisch et al. | 528/75 |
| 5,153,261 A | * | 10/1992 | Brooks | 525/28 |
| 5,185,420 A | | 2/1993 | Smith et al. | 528/61 |
| 5,189,073 A | | 2/1993 | Humbert et al. | 521/110 |
| 5,189,075 A | | 2/1993 | Zimmerman et al. | 521/159 |
| 5,231,159 A | | 7/1993 | Patterson et al. | 528/53 |
| 5,319,058 A | | 6/1994 | Hattori et al. | 528/67 |
| 5,391,826 A | * | 2/1995 | Speranza et al. | 564/138 |
| 5,442,034 A | | 8/1995 | Primeaux, II | 528/60 |
| 5,480,955 A | | 1/1996 | Primeaux, II | 528/60 |
| 5,504,181 A | | 4/1996 | Primeaux, II | 528/60 |
| 5,606,003 A | * | 2/1997 | Wang et al. | 528/60 |
| 5,616,677 A | | 4/1997 | Primeaux, II et al. | 528/66 |
| 5,621,043 A | * | 4/1997 | Croft | 525/111 |
| 5,627,120 A | | 5/1997 | Le-Khac | 502/156 |
| 5,731,397 A | | 3/1998 | Primeaux, II et al. | 528/73 |
| 5,759,695 A | | 6/1998 | Primeaux, II | 428/425.5 |
| 5,767,323 A | | 6/1998 | Televantos et al. | 568/613 |
| 5,955,534 A | * | 9/1999 | Simroth et al. | 524/762 |
| 5,962,144 A | | 10/1999 | Primeaux, II | 428/425.5 |
| 5,962,618 A | | 10/1999 | Primeaux, II et al. | 528/61 |
| 5,962,748 A | * | 10/1999 | Lambert | 568/618 |
| 6,013,755 A | | 1/2000 | Primeaux, II et al. | 528/68 |
| 6,020,451 A | * | 2/2000 | Fishback et al. | 528/76 |
| 6,077,926 A | | 6/2000 | Fishback et al. | 528/76 |
| 6,103,850 A | * | 8/2000 | Reichel et al. | 528/60 |
| 6,143,802 A | * | 11/2000 | Simroth et al. | 521/123 |
| 6,211,292 B1 | * | 4/2001 | St. Clair | 525/98 |

FOREIGN PATENT DOCUMENTS

| | | | | |
|---|---|---|---|---|
| JP | 02263820 A | | 10/1990 | C08G/18/50 |
| WO | WO 92/07892 | | 5/1992 | C08G/18/48 |

* cited by examiner

*Primary Examiner*—P. Hampton-Hightower
(74) *Attorney, Agent, or Firm*—Stoel Rives LLP

(57) ABSTRACT

Low unsaturation, high molecular weight polyols having an unsaturation level below or equal to 0.006 milli-equivalents per gram, and preferably below 0.004 milli-equivalents per gram, and molecular weights of greater than or equal to about 2,000, and preferably between about 2,000 and 10,000, are converted into low unsaturation, high molecular-weight (LUSHMW) polyamines directly by amination reactions. The LUSHMW polyamines produce polymers having elongation, modulus, and tensile characteristics that are substantially better than those of conventional analogous polymers.

43 Claims, No Drawings

POLYMERS DERIVED FROM LOW UNSATURATION POLYAMINES

RELATED APPLICATIONS

This patent application derives priority from U.S. Provisional Application No. 60/227,552, filed Aug. 23, 2000, and from U.S. Provisional Application No. 60/208,078, filed May 26, 2000.

FEDERALLY SPONSORED RESEARCH OR DEVELOPMENT

Not Applicable.

TECHNICAL FIELD

The invention relates to polymers and, in particular, polymers wherein at least one of the monomers is a polyamine with end group unsaturation no greater than 0.006 milliequivalents per gram.

BACKGROUND OF THE INVENTION

Relatively low unsaturation, high molecular-weigh polyols are known and have unsaturation of about 0.02 to 0.06 milliequivalents per gram (meq/g). Low unsaturation means that the ends of the polyol, of which there must be two or more, contain a very high proportion of —OH (alcohol) groups, with very few of the ends containing —CH=$CH_2$ groups, the latter being known as "unsaturated."

U.S. Pat. No. 5,100,997 ('997 patent) discloses the preparation of elastomers using high molecular weight polyols and polyamines having low unsaturation. The polyols were prepared using a double metal cyanide (DMC) complex catalyst and had end group unsaturation of no greater than 0.06 meq/g of polyol. DMC catalysts can yield polyols that have unsaturation that is largely independent of the molecular weight of the polyol. The polyamines were produced by amination of the polyols in about 85% conversion, with the remainder being unconverted alcohol groups. The polyols were reacted with isocyanates to produce polyurethanes. On the other hand, when the polyamines were reacted with isocyanates, they produced polyureas. U.S. Pat. No. 5,096,993 discloses that elastomer properties are improved when the degree of unsaturation is reduced to less than 0.04 and 0.02 meq/g, respectively, of these polyols. U.S. Pat. No. 5,185,420 discloses two samples of a polyol having unsaturation of 0.005 and 0.007 meq/g that were subsequently reacted with a diphenylmethane diisocyanate to form a polyurethane.

More recently low unsaturation, high molecular-weight polyols having a degree of unsaturation no greater than 0.006 meq/g were produced and have been commercialized under the trade name Acclaim®. The catalysts used to create the Acclaim® polyols are a new class of DMC catalysts known as the Impact® catalysts. U.S. Pat. No. 5,627,120 ('120 patent) describes some of the high molecular-weight polyols produced by Impact® catalysts. The advantages of Acclaim® polyol technology over conventional polyol technology are well known. Some of the advantages lie in the physical properties of polyurethanes that are produced by reacting these low unsaturation Acclaim® polyols with polyisocyanates.

It is also well known that conventional alcohols can be converted into amines. One of many methods for this transformation includes the cyanoethylation of alcohols, followed by reduction of the cyano group with hydrogen to provide aminoethyl ethers. Other exemplary conversions of polyols to amine-terminated polyethers are described in U.S. Pat. No. 3,654,370 and U.S. Pat. No. 4,766,245. U.S. Pat. No. 4,902,777 discloses an amine produced from a polyol having an unsaturation of 0.009 meq/g.

Conventional polyamines have been used to make epoxy polymers and polyureas. Such conventional polyamines are exemplified by amine-terminated polyethers, such as those produced by the Huntsman Corporation (Huntsman) under the trade-name of Jeffamines. Comparable products are made by the BASF Corporation (BASF). These polyamines are combined with epoxy-rich monomers and polymers or with polyisocyanates to create epoxy polymers and polyureas, respectively. The polyisocyanates are either monomers with more than one isocyanate or pre-polymers with more than one isocyanate, and these may have a plurality of bond types forming the backbone of the pre-polymers. Both Huntsman and BASF utilize conventional polyols with unsaturation that is greater than 0.01 milli-equivalents/gram, and generally greater than 0.03 milli-equivalents/gram, to create their commercial polyamine products. These amine-containing products carry forward the unsaturation level of the polyol raw materials. U.S. Pat. No. 6,077,926 describes some physical property improvements in polyurethane elastomers that are derived from having low unsaturation, defined as 0.04–0.07 meq/g of unsaturation, in comparison to polyols with unsaturation of generally 0.10 meq/g or greater. U.S. Pat. No. 4,902,768 discloses elastomers and processes for their production from polyamines.

SUMMARY OF THE INVENTION

An object of the present invention is, therefore, to provide polymers derived from low unsaturation polyamines that are derived from low unsaturation polyols, where "low" is defined as less than or equal to 0.006 milli-equivalents per gram.

Another object of this invention is to provide such low unsaturation polyamine-derived polymers, having superior physical properties.

Although the '997 patent mentions low unsaturation polyamines made from relatively-low unsaturation, high molecular-weight polyols having end group saturation of less than 0.06 meq/g, the '997 patent does not, however, teach any advantage for using products made from low unsaturation polyamines. The implication is that experiments concerning the physical properties of low unsaturation polyamines may not have been performed, or if so, the results were insufficiently interesting for the inventors of the '997 patent to disclose any physical property advantages. Similarly, the '120 patent does not suggest the production or advantages of low unsaturation high molecular weight (LUSHMW) polyamines or of products made from them.

The present invention provides polymers, including and exemplified by, but not limited to polyureas, made with LUSHMW polyamines made from low unsaturation, high molecular weight polyols, such as Acclaim®-derived polyols. Polymers derived from amine-functionalized LUSHMW polyamines (LUSHMW-AF polymers) have surprisingly superior properties to those of polymers made with commercially available polyetheramines.

An advantage of this invention is that polymers, and more particularly polymers derived from amine-functionalized polyethers (LUSHMW-AF polyethers), made from the LUSHMW polyols (<0.006 meq/g unsaturation) are stronger and tougher than polymers made with conventional polyamines. Stronger and tougher polymers last longer and are useful under more aggressive conditions in service than polymers made with conventional technology.

Another advantage of this invention is that stronger and tougher polymers may permit equal service lifetime with smaller parts or thinner coatings than those required with conventional technology.

The final physical and mechanical properties of these product polymers may be dictated by the combination of the properties of the starting chemicals. The better the properties of polyols and/or polyamines, the better the properties of the final products. The physical and mechanical properties of the resulting polymers improve as molecular weight increases, an effect of having more chain extension and fewer chain termination events. Thus, one explanation for some of the advantages of the LUSHMW-AF polymers is that higher molecular weight polymers are formed when the individual chains contain two —OH or two amine groups, rather than when individual chains contain unsaturated end groups. Unsaturation leads to polymer chain termination events, and thus molecular weight limitation of the final polymer.

Similarly, Acclaim®-derived triamines (with theoretically three amine groups per molecule) have a much lower unsaturation than conventional triamines, and thus the properties that would be obtained from a perfect triamine, and those of the LUSHMW-AF polymers made from them, are much more closely approximated by an Acclaim®-derived triamine than a conventional triamine.

Additional objects and advantages of this invention will be apparent from the following detailed description of preferred embodiments thereof.

DETAILED DESCRIPTION OF PREFERRED EMBODIMENTS

In a preferred embodiment of the present invention, low unsaturation high molecular weight (LUSHMW) polyols having an unsaturation level below or equal to 0.006 milliequivalents per gram, and preferably below 0.004 meq/g, and molecular weights of greater than or equal to about 2,000 are made preferably with double medal cyanide catalysts and more preferably with an Impact® catalyst utilized by Bayer and described in U.S. Pat. Nos. 5,767,323 and 5,627,120, the disclosures of which are herein incorporated by reference. Some of these LUSHMW polyols can be purchased from Bayer under the tradename Acclaim®. Low unsaturation high molecular weight polyols made under other conditions, such as with a cesium hydroxide catalyst under low temperature, could also be employed to the extent that they exhibit unsaturation below 0.006 meg/g, although such low unsaturation products have not been disclosed using that method. Preferably LUSHMW polyol diols or triols have molecular weights of greater than or equal to about 2,000, 4,000, 6,000, 8,000, 10,000 or 20,000 and preferably between about 2,000 and 20,000; however, other molecular-weight LUSHMW polyol starting materials can be used.

The LUSHMW polyols are converted into low unsaturation high molecular weight polyamines directly by known amination reactions. For example, the amination reaction can be done with ammonia or primary amines, so as to create either terminal —$NH_2$ groups, or terminal —NHR groups, where R may be an alkyl of various lengths and branching. Such alkyl groups can provide a way to control the reactivity of the active amine, with bulkier R groups slowing the reaction relative to smaller R groups. Creating LUSHMW secondary amines with LUSHMW polyols can also be accomplished through known amination reactions. Exemplary reactions for converting polyols to amine-terminated polyethers are disclosed in U.S. Pat. Nos. 3,654,370 and 4,766,245.

The resulting LUSHMW.polyamines have superior properties to those of polyamines made from conventional high unsaturation polyols. For example, these LUSHMW polyols can be converted to polyamines with conversion efficiencies of greater than or equal to 90%, and preferably greater than or equal to 95%. It is noted that experiments to date suggest that the degree of unsaturation plays a more significant role than conversion efficiency because at least most of the unconverted alcohols react. As a result, these LUSHMW polyamines possess better unsaturation/amination than the ones disclosed in the '997 patent and exhibit much better properties. These advantages are also apparent in secondary amines made from LUSHMW polyols.

In the case of primary amines, primary amine functionality of the polyethers, i.e. the average number of primary amine moieties per molecule, can be defined by the OH functionality multiplied by the amination conversion multiplied by the selectivity to primary amine. A LUSHMW polyamine will have a primary amine functionality of greater than or equal to about 1.98 and will be a chain terminator of less than or equal to about 2%, while a conventional KOH-derived polyol converted to an amine will have a primary amine functionality of about 1.7 and will be a chain terminator of greater than about 26%.

These LUSHMW polyamines can be used to prepare high molecular weight polymers including but not limited to: polyureas and hybrid polyurethane/polyureas; amine-hardened epoxy polymers; polyamides; polysulfonamides; polymers derived from a Michael addition reaction of polyamines with di- or higher functionalized unsaturated monomers, such as acrylates, methacrylates, acrylamides, methacrylamides, styrene, vinyl acetate, and other vinyl monomers; polyketeneimines that can be converted into substituted polyamides and polyamidines; Mannich polymers; chain-extended phenol-formaldehyde polymers; all other reactions of polyamines with di- or multi-functional electrophiles known to react with amines; or any combinations thereof.

Thus, in addition to polyureas made using polyisocyanates that have urethane backbone linkages and isocyanate end groups, any polymer with isocyanate or other electrophilic end groups can be utilized in a similar fashion.

Some of the above-listed polymers are presented in more detail below:

Polyureas such as represented by the general formula:

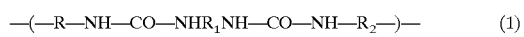 (1)

Polyurethane/polyurea hybrids such as represented by the general formula:

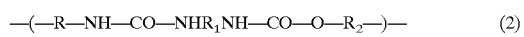 (2)

Amine-hardened epoxy polymers such as represented by the general formula:

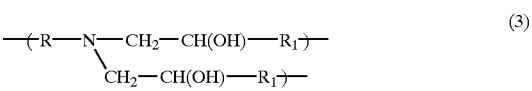 (3)

Polyamides such as represented by the general formula:

 (4)

Polysulfonamides such as represented by the general formula:

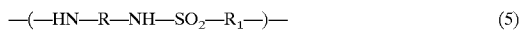  (5)

Polymers derived from Michael addition reaction of polyamines with di- or higher functionalized unsaturated monomers, such as acrylates, methacrylates, acrylamides, methacrylamides and other vinyl polymers such as represented by the general formula:

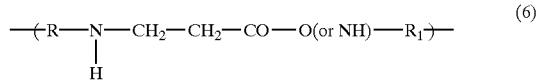  (6)

Polyketeneimines that can be converted into substituted polyamides and polyimidines such as represented by the general formula:

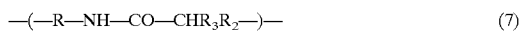  (7)

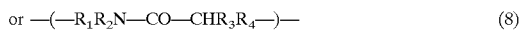  (8)

Mannich polymers such as represented by the general formula:

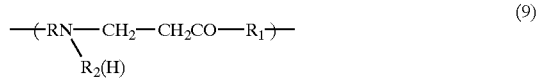  (9)

Chain extended phenol-formaldehyde polymers such as represented by the general formula:

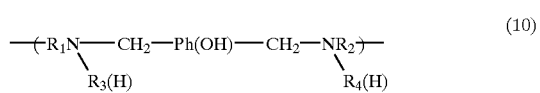  (10)

These LUSHMW-AF polymers have superior properties to those of polymers made from polyamines derived from conventional high unsaturation polyols. These advantages are also apparent in polymers made from secondary LUSHMW polyamines. Furthermore, random or block copolymers made from LUSHMW polyamines also share these advantages. One such exemplary LUSHMW-AF copolymer is random or block polymer derived from polyethylene glycol ether and polypropylene glycol ether aminated to form either a diamine or a triamine.

The LUSHMW-AF polymers have higher average molecular weights, partly due to fewer chain termination events. Moreover, the products made from the LUSHMW-AF polymers have better properties than those derived from conventional polyamines. These products include, but are not limited to: caulks; sealants; flexibilized, tough thermoplastic and thermoset polymers; adhesives; repair formulations to repair holes, breaks, cracks in virtually any substrate (such as concrete, wood, and plastic); coatings with greater physical properties, and lower levels of extractables; and tougher foams.

In addition, because some amine-terminated polyethers are typically used on the B-side in spray and reaction injection molding (RIM) applications, chain extenders could also be mixed with LUSHMW-AF polyethers. Preferred chain extenders include, but are not limited to, diols or aromatic diamines or mixtures thereof. Typical diols include ethylene glycol, butane diol, hexane diol, propylene glycol, bisphenol A, ethoxylated and/or propoxylated bisphenol A, or polyalkylene oxide polyols with molecular weights between about 60 and about 500.

Preferred aromatic diamine chain extenders are those which contain at least one alkyl substituent in the ortho-position to a first amino group and two alkyl substituents in the ortho-position to a second amino group or mixtures thereof, preferably with the proviso that at least two of said alkyl substituents contain at least two carbon atoms. Typical aromatic diamine extenders include diethyltoluene diamine, t-butyl toluene diamine, 1-methyl-3,5-diethyl-2,4-diaminobenzene, 1-methyl-3,5-diethyl-2,6-diaminobenzene, 3,5,3',5'-tetraethyl-4,4'-diaminodiphenylmethane, 4,4'-bis(sec-butylamino) diphenylmethane, and combinations thereof.

Furthermore, conventional blowing agents and/or other additives could also mixed with the LUSHMW polyamines. Some preferred blowing agents are listed in U.S. Pat. No. 5,100,997, the description of which is herein incorporated by reference. Some preferred optional additives include e.g. dyes, biocides, plasticizers, mold release agents, plasticizers, adhesion promoters, fillers and pigments like mica, glass flakes or glass matts, carbon black, talc, silicones, phthalocyanine blue or green dye, $TiO_2$, UV absorbers, $MgCO_3$, $CaCO_3$ and the like.

A spray gun is an application device that physically separates the chemical components until a trigger is activated. Once the trigger is activated, the components combine and are correspondingly atomized to create a uniform polymeric film on a given substrate. Spray polyurea products typically use an impingement, mechanical or air purged, spray gun capable of applying polyurea products under high-pressure and high temperature conditions (e.g., Gusmer GX-7 400 series).

A hydraulically or air-driven meter may be employed to accurately dispense specific volumes of liquid chemicals at a specified ratio. Typically, the ratio is one-to-one by volume and the output can range from grams to several pounds a minute (e.g., Gusmer H-20/35).

Alternatively, relatively rigid cartridges, either side-by-side or co-axial, can be used to store unmixed chemical components (diisocyanate and resin) in pre-measured quantities.

EXAMPLE 1

A 4000 molecular-weight polyether diol (polypropylene glycol) with 0.506 meq/g of —OH groups, and unsaturation of 0.0039 meq/g (Acclaim® 4200) was aminated to provide 0.494 meq/g of a total amine Acclaim® 4200-derived product, (Polyamine -1). Polyamine -1 had an unsaturation of 0.0039 meq/g and a calculated functionality of 1.984. A commercially available sample of Huntsman's D-4000 (amine-terminated polypropylene glycol) was used as Polyamine -2. Polyamine -2 had an unsaturation on 0.085 meq/g and a calculated functionality of 1.71. Identical formulas were prepared, with two samples each, the only difference between the two samples being that in the first sample, Polyamine -1 was used, and in the second sample, Polyamine -2 was used. The results are the average of five separate determinations. Tensile strength, modulus, and elongation % are used to characterize specific mechanical performance of these polyamine product materials and are well defined in ASTM test number D412. Tensil strength is the maximum stress (pounds per square inch) before a polymer breaks. These samples were prepared by casting films.

A) In a first experiment, X-326, the following formulations were used, and the samples were cured at room temperature.

|  | X-326-1 | X-326-2 |
| --- | --- | --- |
| Index | 1.04 | 1.04 |
| Ethacure 100 (DETDA) | 31.35 | 31.35 |
| Acclaim ® 4200-derived diamine | 68.65 | 0 |
| Huntsman D-4000 diamine | 0 | 68.65 |
| Mondur 1453 isocyanate (Bayer) Baytec MP-160 | 95.00 | 95.00 |
| Propylene Carbonate | 5.00 | 5.00 |
| % NCO | 15.20 | 15.20 |
| Results |  |  |
| % Elongation, 2 days | 374 | 216 |
| % Elongation, 7 days | 562 | 358 |
| Tensile, 2 days, psi | 1488 | 1206 |
| Tensile, 7 days, psi | 2431 | 1703 |
| 100% Modulus, 2 days, psi | 1212 | 1160 |
| 100% Modulus, 7 days, psi | 1398 | 1319 |
| 200% Modulus, 2 days, psi | 1314 | 1203 |
| 200% Modulus, 7 days, psi | 1620 | 1475 |
| 300% Modulus, 2 days, psi | 1422 | not tested |
| 300% Modulus, 7 days, psi | 1868 | 1627 |

B) In a second experiment, X-327, the following formulation was used, and the samples were cured at room temperature.

|  | X-327-1 | X-327-2 |
| --- | --- | --- |
| Index | 1.041 | 1.041 |
| Ethacure 100 (DETDA) | 21.25 | 21.25 |
| Unilink 4200 diamine (UOP) | 18.85 | 18.85 |
| Acclaim ® 4200-derived diamine | 60.00 | 0 |
| Huntsman D-4000 diamine | 0 | 60.00 |
| Mondur 1453 isocyanate (Bayer) Baytec MP-160 | 95.00 | 95.00 |
| Propylene Carbonate | 5.00 | 5.00 |
| % NCO | 15.20 | 15.20 |
| Results |  |  |
| % Elongation, 2 days | 479 | 242 |
| % Elongation, 7 days | 566 | 480 |
| Tensile, 2 days, psi | 1883 | 1114 |
| Tensile, 7 days, psi | 2537 | 1787 |
| 100% Modulus, 2 days, psi | 1127 | 1036 |
| 100% Modulus, 7 days, psi | 1262 | 1190 |
| 200% Modulus, 2 days, psi | 1316 | 1094 |
| 200% Modulus, 7 days, psi | 1520 | 1340 |
| 300% Modulus, 2 days, psi | 1520 | not tested |
| 300% Modulus, 7 days, psi | 1797 | 1509 |

C) In a third experiment, X-328, the following formulation was used, and the samples were cured at room temperature.

|  | X-328-1 | X-328-2 |
| --- | --- | --- |
| Index | 1.041 | 1.041 |
| Ethacure 100 (DETDA) | 5.50 | 5.50 |
| Unilink 4200 (UOP) | 31.50 | 31.50 |
| Acclaim ® 4200-derived diamine | 63.00 | 0 |
| Huntsman D-4000 diamine | 0 | 63.00 |
| Mondur 1437 isocyanate (Bayer) Baytec MP-101 | 57.00 | 57.00 |
| Mondur 1453 isocyanate (Bayer) Baytec MP-160 | 38.00 | 38.00 |
| % NCO | 11.78 | 11.78 |

|  | X-328-1 | X-328-2 |
| --- | --- | --- |
| Results |  |  |
| % Elongation, 1 day | 879 | 716 |
| % Elongation, 7 days | >957* | 884 |
| Tensile, 1 day, psi | 980 | 521 |
| Tensile, 7 days, psi | >1862 | 1352 |
| 100% Modulus, 1 day, psi | 305 | 260 |
| 100% Modulus, 7 days, psi | 392 | 397 |
| 200% Modulus, 1 day, psi | 391 | 323 |
| 200% Modulus, 7 days, psi | 527 | 508 |
| 300% Modulus, 1 day, psi | 467 | 375 |
| 300% Modulus, 7 days, psi | 661 | 611 |

Numbers with greater than (>) signs indicate that the ultimate elongation was greater than the elongation measurable on the Instron® testing machine that was employed. Thus, the reported tensile strengths are those measured at the maximum elongation measurable with the testing machine, roughly about 975% for the examples presented.

D) In a fourth experiment, X-331 the formulation used was identical to the formulation for the X-328 series, but in this experiment, the samples were cured at 60 degrees Celsius for 24 hours, and measurements were made 1 and 7 days later.

| Results | X-331-1 | X-331-2 |
| --- | --- | --- |
| % Elongation, 1 day | >966 | >956 |
| % Elongation, 7 days | >973 | >973 |
| Tensile, 1 day, psi | >2263 | >1263 |
| Tensile, 7 days, psi | >3052 | >1811 |
| 100% Modulus, 1 day, psi | 411 | 354 |
| 100% Modulus, 7 days, psi | 464 | 394 |
| 200% Modulus, 1 day, psi | 550 | 455 |
| 200% Modulus, 7 days, psi | 629 | 514 |
| 300% Modulus, 1 day, psi | 692 | 547 |
| 300% Modulus, 7 days, psi | 804 | 631 |

E) In a fifth experiment, X484, the formulation used was similar to the formulation for the X-328 series, but a new batch of Acclaim D-4200 (2001) was used in this experiment and the samples were cured at 60 degrees Celsius for 24 hours, and measurements were made 1 day later (X484-3). Also, a new batch of polymer derived from a D-4000 Jeffamine was used (X-484-4) for comparison. In addition, new equipment enabled testing beyond 1000% elongation.

$E_o$)

| Results | X-484-3 | X-484-4 | % Difference % Improvement in LUSHMW amine-derived polymer |
| --- | --- | --- | --- |
| % Elongation, 1 day | 1015 | 865 | 14.78 |
| Tensile, 1 day, psi | 1669 | 950 | 43.08 |
| 200% Modulus, 1 day, psi | 458 | 403 | 12.01 |
| 400% Modulus, 1 day, psi | 692 | 563 | 18.64 |
| 600% Modulus, 1 day, psi | 964 | 730 | 14.78 |

COMPARISONS WITH EXAMPLE D:

$E_1$)

| Results | X-331-1 | X-331-2 | % Difference |
|---|---|---|---|
| % Elongation, 1 day | 966 | 956 | 1.04 |
| Tensile, 1 day, psi | 2263 | 1263 | 44.19 |
| 200% Modulus, 1 day, psi | 550 | 455 | 17.27 |
| 400% Modulus, 1 day, psi | 845 | 640 | 24.26 |
| 600% Modulus, 1 day, psi | 1220 | 842 | 30.98 |

$E_2$)

| Results | X-331-1 | X-484-3 | % Change |
|---|---|---|---|
| % Elongation, 1 day | 966 | 1015 | 5.07 |
| Tensile, 1 day, psi | 2263 | 1669 | −26.25 |
| 200% Modulus, 1 day, psi | 550 | 458 | −16.73 |
| 400% Modulus, 1 day, psi | 845 | 692 | −18.11 |
| 600% Modulus, 1 day, psi | 1220 | 964 | −20.98 |

$E_3$)

| Results | X-331-2 | X-484-4 | % Change |
|---|---|---|---|
| % Elongation, 1 day | 956 | 865 | −9.52 |
| Tensile, 1 day, psi | 1263 | 950 | −24.78 |
| 200% Modulus, 1 day, psi | 455 | 403 | −11.43 |
| 400% Modulus, 1 day, psi | 640 | 563 | −12.03 |
| 600% Modulus, 1 day, psi | 842 | 730 | −13.30 |

Although the numerical values presented in Example E are generally consistently lower than in Example D for both the LUSHMW amine-derived and Jeffamine-derived polymers, the percentage difference from the DA4000 Jeffamine should be noted. When the measurement technique was changed, the experiment changed, rendering the absolute values less significant. Skilled persons will appreciate that the % changes in the two experiments presented in Tables $E_2$ and $E_3$ are similar.

EXAMPLE 2

Polyurea sealants, with a gel time of >3 minutes and hardness of <95 Shore A, were prepared utilizing the Acclaim® 4200 diamine (X303-1 and X316-1) and with Jeffamine® D-4000 (X303-2 and X316-2). See ASTM C 920 for a discussion of the various classes of and requirements for sealants. The sealants in the following examples are derived from aromatic polyisocyanates. It follows that similar superior properties would be expected for polymers derived from aliphatic polyisocyanates and the LUSHMW polyamines. Aliphatic polyisocyanates tend to resist discoloration due to ultraviolet light.

| Formula | X303-1 | X303-2 | X316-1 | X316-2 |
|---|---|---|---|---|
| Index | 1.075 | 1.075 | 1.04 | 1.04 |
| Ethacure 100 | 0 | 0 | 3 | 3 |
| Unilink 4200 | 30 | 30 | 34 | 34 |
| Acclaim 4200-derived diamine | 70 | 0 | 63 | 0 |
| Huntsman D-4000 diamine | 0 | 70 | 0 | 63 |
| Baytec MP-010 | 95 | 95 | 55 | 55 |
| Baytec MP-160 | 0 | 0 | 36 | 36 |
| Propylene Carbonate | 5 | 5 | 9 | 9 |
| Results |  |  |  |  |
| Gel Time, minutes (SVNC) | 23 | 26 | 9 | 8 |
| Shore A |  |  |  |  |
| 1 day*/3 days | 30 | 20 | 55* | 50 |
| 7 days | 45 | 35 | 75 | 65 |
| Tensile, psi |  |  |  |  |
| 1 day*/3 days | 103 | 51 | 232* | 115* |
| 7 days | 455 | 182 | 1580 | 901 |
| 100% Modulus, psi |  |  |  |  |
| 1 day*/3 days | 38 | 16 | 74* | 58* |
| 7 days | 96 | 53 | 266 | 208 |
| 200% Modulus, psi |  |  |  |  |
| 1 day*/3 days | 43 | 17 | 101* | 79* |
| 7 days | 123 | 64 | 368 | 284 |
| 300% Modulus, psi |  |  |  |  |
| 1 day*/3 days | 47 | 17 | 126* | 92* |
| 7 days | 149 | 75 | 472 | 355 |
| Elongation, % |  |  |  |  |
| 1 day*/3 days | >1000 | >1000 | 863* | 802 |
| 7 days | >1000 | >1000 | >1000 | >1000 |

Data with an asterisk (*) indicates the number of days that the measurement was taken. The number of days in also indicated with an asterisk in the left hand column. For example, Sample X316-1 Shore A hardness was 55 after 1 day, while Sample X-316-2 Shore A hardness only achieved 50 after 3 days. Scanning Vibrating Needle Curemeter (SVNC) is an instrument designed to monitor the cure profile of polymer products.

EXAMPLE 3

Spray polyurea elastomers were prepared according to the following formulas. Samples X314-1 and X326-1 were made with the Acclaim 4200 derived diamine, while Samples X-314-2 and X326-2 were made with Jeffamine D4000.

| Formula | X314-1 | X314-2 | X326-1 | X326-2 |
|---|---|---|---|---|
| Index | 1.16 | 1.16 | 1.04 | 1.04 |
| Ethacure 100 | 15 | 15 | 31 | 31 |
| Unilink 4200 | 20 | 20 | 0 | 0 |
| Acclaim 4200-derived diamine | 65 | 0 | 69 | 0 |
| Huntsman D-4000 diamine | 0 | 65 | 0 | 69 |
| Baytec MP-160 | 90 | 90 | 95 | 95 |
| Propylene Carbonate | 10 | 10 | 5 | 5 |
| Results |  |  |  |  |
| Gel Time, seconds | 40 | 43 | 12 | 13 |
| Shore D |  |  |  |  |
| 1 day/2 days* | 30 | 30 | 55* | 55* |
| 7 days | 47 | 47 | 55 | 55 |

-continued

| Formula | X314-1 | X314-2 | X326-1 | X326-2 |
|---|---|---|---|---|
| Tensile, psi | | | | |
| 1 day/2 days* | 486 | 444 | 1488* | 1207* |
| 7 days | 2235 | 1506 | 2431 | 1703 |
| 100% Modulus, psi | | | | |
| 1 day/2 days* | 471 | 439 | 1212* | 1160* |
| 7 days | 977 | 880 | 1398 | 1319 |
| 200% Modulus, psi | | | | |
| 2 days | NT | NT | 1314 | 1203 |
| 7 days | 1220 | 1034 | 1620 | 1475 |
| 300% Modulus, psi | | | | |
| 2 days | NT | NT | 1422 | NT |
| 7 days | 1482 | 1192 | 1868 | 1627 |
| Elongation, % | | | | |
| 1 day | 185 | 149 | 374 | 216 |
| 7 days | 520 | 456 | 562 | 358 |

Note: The asterisks (*) have the same meaning as described in Example 2.

Also, a specialized static-mixing technique was employed to produce the above samples. A static mixer is a device that has a series of internal elements within a cylindrical tube. Chemical components (e.g., diisocyanate and polyamine resin) are forced through the mixer and they are repeatedly divided and recombined, creating a uniform mixture. Our laboratory tests and publications (House, D. and Ilijevski, D. 2000, "Evaluating a Secondary Aliphatic Diamine Curative in Colorless, Light-Stable, IPDI-Based Polyurea Coatings Using a New Low-Pressure, Static-Mixing Technique," Conference Proceedings Polyurethanes 2000, 2000, pp.207–218) have documented that polyurea mechanical properties obtained from this static-mixing technique directly correlate to results that are obtained when the polyurea formula is processed through a high-pressure, impingement mixing equipment.

These examples are herein presented only by way of example to polyols derived from polypropylene- or polyethylenegycol (PPG) or (PEG) polyethers. Skilled persons will appreciate that other diols or triols having very high percentages of both ends with —OH groups can be aminated and produce polymers having similar advantageous properties.

It will be obvious to those having skill in the art that many changes may be made to the details of the above-described embodiments of this invention without departing from the underlying principles thereof. The scope of the present invention should, therefore, be determined only by the following claims.

What is claimed is:

1. A polymer comprised of a reaction product of
    a polyamine having an end-group unsaturation of less than 0.006 milli-equivalents/gram and a molecular weight greater than 2,000, and
    a di- or higher functional electrophilic monomer.

2. The polymer of claim 1 in which the polyamine comprises a molecular weight of greater than or equal to 4,000.

3. The polymer of claim 1 in which the polyamine comprises a molecular weight of greater than or equal to 8,000.

4. The polymer of claim 2 in which the polyamine comprises a primary amine.

5. The polymer of claim 2 in which the polyamine comprises a secondary amine.

6. The polymer of claim 2 in which the polyamine comprises a polypropylene glycol ether diamine.

7. The polymer of claim 2 in which the polyamine comprises a polypropylene glycol ether triamine.

8. The polymer of claim 2 in which the polyamine comprises a polyethylene glycol ether diamine.

9. The polymer of claim 2 in which the polyamine comprises a polyethylene glycol ether triamine.

10. The polymer of claim 2, comprising a random or block copolymer of polyethylene glycol ether and polypropylene glycol ether aminated to form a diamine.

11. The polymer of claim 2, comprising a random or block copolymer of polyethylene glycol ether and polypropylene glycol ether aminated to form a triamine.

12. The polymer of claim 2, comprising a random or block copolymer derived from at least two distinct polyamines having a molecular weight greater than or equal to 2000 and end-group unsaturation of less than or equal to 0.006 milli-equivalents/gram reacted with a di- or higher functional electrophilic monomer.

13. The polymer of claim 1 in which the electrophilic monomer is an aromatic polyisocyanate.

14. The polymer of claim 1 in which the electrophilic monomer is an aliphatic polyisocyanate.

15. The polymer of claim 1 in which the electrophilic monomer component is a blend of aromatic and aliphatic polyisocyanates.

16. The polymer of claim 2, comprising an amine-hardened epoxy polymer.

17. The polymer of claim 2, comprising a polyamide.

18. The polymer of claim 2, comprising a polymer derived from a Michael addition reaction of a LUSHMW polyamine with a di- or higher functionalized unsaturated monomer.

19. The polymer of claim 1 further comprising an amine-functionalized polyether.

20. The polymer of claim 2 further comprising an amine-functionalized polyether.

21. A coating composition comprising the polymer of claim 2.

22. The coating composition of claim 21 wherein the polymer is a spray polyurea elastomer derived by the reaction of combining together a component A and a component B through a plural component meter and spray gun wherein:
    component A comprises a modified isocyanate-terminated prepolymer, created by reacting an isocyanate with an active hydrogen-containing material selected from a LUSHMW polyamine, LUSHMW polyol, or other low unsaturation polyamine or polyol, and adding an alkylene carbonate; and
    component B comprises at least one LUSHMW polyamine resin, an aliphatic, cycloaliphatic, or aromatic chain extender, optionally containing a polyaspartic ester (PAE), and/or a polyimine.

23. A caulk comprising the polymer of claim 2.

24. A sealant comprising the polymer of claim 2.

25. The sealant of claim 24 wherein the polymer is a polyurea formed by the reaction of combining together a component A and a component B through plural component metering, static mixing, or hand mixing wherein:
    component A comprises a modified isocyanate-terminated prepolymer, created by reacting an isocyanate with an active hydrogen-containing material selected from a LUSHMW polyamine, LUSHMW polyol, or other low unsaturation polyamine or polyol; and component B comprises at least one LUSHMW polyamine resin, an aliphatic, cycloaliphatic, or aromatic chain extender, or a blend of a LUSHMW polyamines, optionally containing a LUSHMW polyol, polyaspartic ester, and/or polyimine.

26. The sealant of claim 22 in which the stoichiometry of the components A and B is adjusted to provide a molar excess of polyisocyanate over active hydrogen containing resins, such that the sealant achieves its final cure upon reaction with ambient moisture.

27. An adhesive comprising the polymer of claim 2.

28. A foam comprising the polymer of claim 2.

29. A method for preparing a polymer having superior properties, comprising:

converting a polyol having a molecular weight greater than or equal to 2000 and an end-group unsaturation level of less than or equal to 0.006 milli-equivalents per gram into a high molecular weight low unsaturation polyamine; and reacting the high molecular weight low unsaturation polyamine with a di- or higher functional electrophilic monomer to produce a low unsaturation high molecular weight amine-functionalized (LUSHMW-AF) polymer.

30. The method of claim 29 in which the LUSHMW-AF polymer is a polyether.

31. The polymer of claim 1, wherein the polyamine has a primary amine functionality of greater than about 1.98.

32. The polymer of claim 1, comprising a random or block copolymer derived from at least two distinct polyamines having a molecular weight greater than or equal to 4000 and end-group unsaturation of less than or equal to 0.004 milli-equivalents/gram reacted with a di- or higher functional electrophilic monomer.

33. The polymer of claim 1, wherein the polyamine comprises the reaction product of a low unsaturated, high molecular weight polyol with a second reactant to produce the polyamine.

34. The polymer of claim 33, wherein the polyol has an unsaturation of less than 0.004 milli-equivalents/gram.

35. The polymer of claim 1, wherein the polyamine has an unsaturation of less than 0.004 milli-equivalents/gram.

36. The polymer of claim 33, wherein the molecular weight of the polyamine is greater than or equal to 8,000.

37. A polymer comprising:

a reaction product of a polyamine, the polyamine comprising a reaction product of:

a polyol having an unsaturation of less than 0.006 milli-equivalents/gram, the polyamine having a primary amine functionality of greater than 1.98; and an electrophilic monomer.

38. The polymer of claim 37, wherein the polyol has a molecular weight greater than 2,000.

39. The polymer of claim 37, wherein the polyol has a molecular weight greater than 4,000.

40. The polymer of claim 37, wherein the polyol has a molecular weight greater than 8,000.

41. The polymer of claim 37, wherein the unsaturation of the polyol is less than 0.004 milli-equivalents/gram.

42. The polymer of claim 39, wherein the unsaturation of the polyol is less than 0.004 milli-equivalents/gram.

43. The polymer of claim 38, wherein the unsaturation of the polyol is less than 0.004 milli-equivalents/gram.

* * * * *

UNITED STATES PATENT AND TRADEMARK OFFICE
CERTIFICATE OF CORRECTION

PATENT NO.     : 6,635,737 B1
DATED          : October 21, 2003
INVENTOR(S)    : Upson et al.

It is certified that error appears in the above-identified patent and that said Letters Patent is hereby corrected as shown below:

Column 2,
Line 39, remove comma after "polymers".
Line 42, change "relatively-low" to -- relatively low" --.

Column 3,
Line 40, change "medal" to -- metal --.

Column 4,
Line 4, change "LUSHMW.polyamines" to -- LUSHMW polyamines --.

Column 6,
Line 60, change "D412" to -- D-412 --.

Column 8,
Line 25, add comma after "X-331".
Line 45, change "X484" to -- X-484 --.

Column 9,
Line 37, change "DA4000" to -- D-4000 --.

Column 10,
Line 48, change "DA4000" to -- D-4000 --.

Signed and Sealed this

Third Day of May, 2005

JON W. DUDAS
*Director of the United States Patent and Trademark Office*